Patented Aug. 15, 1944

2,355,889

UNITED STATES PATENT OFFICE 2,355,889

COATING COMPOSITION

James Joseph O'Loughlin, Hawthorne, N. J., assignor to Paint Engineers, Inc., Hawthorne, N. J., a corporation of New Jersey No Drawing. Application November 30, 1940, Serial No. 368,085

10 Claims. (Cl. 106—148)

This invention relates to the production of a solution comprised of an organic compound having an available chromate ion and to its utilization in improved types of coating compositions, paints and metallic, leafing and granular pigment pastes used in such coating compositions and paints.

The effectiveness of the chromate ion for the passivation of ferrous surfaces has long been known. In the past the rust inhibitive chromate ion has been made available by two general methods. In the first method the primer was formulated with a relatively large amount of a chromium-containing pigment, such as zinc chromate. In the second general method a water soluble chromate was dissolved in water and the aqueous solution mixed with the primer vehicle to form an emulsion.

The present invention deals with the production of an organic solution comprising a solvent in which an available chromium-containing compound is dissolved and which compound is, therefore, in highly dispersed condition. The invention also relates to the utilization of this solution together with hydrophobic or hydrophilic vehicles to produce improved types of coating or paint compositions including improved stabilized metallic pigment and other pigment pastes.

In the preferred form of the invention chromic acid is utilized as the chromium-containing material. As is known, chromic acid reacts violently with most organic compounds. Under the present invention the chromic acid is dissolved in an organic vehicle which is miscible with water and which is compatible with the usual organic vehicles of paints, varnishes and the like. The resulting product, therefore, has a very wide permissive range of use in both aqueous and oleaginous coating compositions.

The preferred organic solvent is an ether of a diatomic alcohol, such as ethylene glycol monoethyl ether.

In one method of preparing the chromated organic solution a predetermined amount of the chromic acid, from 1 to 50 parts, is added to about 2,000 parts of the glycol ether. This addition should be done in the cold and with constant stirring. After the acid is all incorporated the solution is preferably heated to a temperature below the boiling point of the solvent and this temperature is maintained for a sufficient period of time to effect optimum solution.

While the chromated solution may be prepared according to the method outlined above, a different procedure is preferred. In this preferred method solution of the acid in the solvent is greatly facilitated by utilizing a mutual solvent, such as water. According to this method the chromic acid is first dissolved in about an equal weight of water of an adjusted pH value. This solution is then added, with proper temperature control and in small amounts at a time, to the glycol ether, until the required degree of dilution or concentration is attained. In these circumstances solution is effected immediately and completely. The chromated solution with its contained water may be used as such for incorporation in aqueous vehicles. If it is desired to remove the water from the system this may readily be done by heating the solution to a temperature sufficiently high to drive off the admixed water. By this method it is possible to incorporate substantially larger proportions of the chromium-containing substance.

The chromated solution above described and as indicated has a wide field of use. This may be incorporated in oils, varnishes, resins and the like to produce protective coatings of improved characteristics. These paints, because of the intimate dispersion of the available chromate, are particularly efficacious for protecting ferrous materials.

The improved chromated solution may be incorporated in a bodied oil to form a product of general utility for the production of rust inhibitive paints and varnishes. For example, the anhydrous chromated solution may be added to an oil vehicle produced by compounding approximately 3 parts by weight of a suitable synthetic resin with three parts of a drying oil and one part of a solvent and plasticizing oil. These three constituents may be heated in a kettle to about 240° F. for a period of time sufficient to insure a homogeneous solution. While this oil is maintained at the indicated temperature, the chromated solution is added, slowly and with vigorous agitation, in the proportion of about 1 part of the chromated solution to about 20 parts of oil. After addition of the chromated solution the mass should be held at the mixing temperature for a period of about a quarter of an hour so as to insure complete homogeneity. Other proportions may be used.

This composition may be employed to formulate paints or other coating compositions of an essentially hydrophobic or oleaginous nature or in emulsions of which the dispersed phase is oleaginous.

As indicated previously the improved composition, i. e. the chromated oil, may be utilized in aqueous coating compositions, such as in water soluble resins. As is known, glyceryl and glycol borates and boriborates are water soluble resins which have a wide field of employment. These products may be employed for coatings and as special sizings for regenerated cellulose, cellulose nitrate and the like. When the chromated solution is incorporated in such products they are considerably improved and may be employed for a variety of purposes, such as protective coatings for ferrous materials.

This type of composition may be produced as in the following example: The boriborate resin is held at an elevated temperautre of about 130 degrees centigrade; the chromated solution previously described is added in the proportions of one gallon of the solution to about thirty-five pounds of the resin. Other proportions may be used. The chromated solution is preferably added a little at a time while the resin is continuously agitated. After complete addition of the chromated solution the temperature of the mass again is adjusted at 130° C. and held at such temperature to complete reaction. The concentrate which for the sake of a term may be called aquachrom, is drawn off from the kettle while hot and stored.

It has been found that such chromated borate resins or aquachroms serve excellently as a component of metallic pastes and paints formulated with both casein and cellulose vehicles. The utilization of the aquachrom definitely enhances the leafing of the metalic flakes and imparts a greater brilliancy and improved stability to the product.

Products of this character may readily be made up from the aquachrom previously described. For example, aluminum paste of improved stability and brilliance may be made up by thoroughly mixing and kneading equal weights of a suitable aluminum powder and the aquachrom. The resulting paste is very brilliant.

Casein metal paints, such as casein aluminum paints, are similarly improved by formulating them with the aquachrom. Such products are definitely superior to typical comparable products made up of aluminum flakes and aqueous casein vericles. The improved products may be produced by thoroughly incorporating the improved stabilized aluminum paste (aluminum flake and aquachrom) in a casein solution in the proportions of one pound of the paste to one gallon of the casein solution, or in proportions as required. The casein solution may itself comprise one part by weight of casein (ammonia and phenolate preserved) to three parts of water. Other proportions may be used.

Improved coating compositions, especially for coating cellulose base material, such as wall board, may be produced by compounding the aquachrom with mica and aluminum. Improved pastes of this character may be produced by thoroughly mixing about ten parts of mica and fourteen parts of aluminum powder with twenty parts of the aquachrom. This produces a stiff paste which may subsequently be dispersed in a suitable aqueous of non-aqueous vehicle. Other combinations may be used.

The improvements which the aquachrom imparts to casein are attainable also with other forms of water soluble bases. For example, improved products may be produced by incorporating the concentrate in cellulose ether compositions, such as methyl cellulose. Improved products of this type may be made up by adding one part by weight of the aquachrom to forty-five parts of methyl cellulose dissolved in about four hundred and fifty parts of water. Other proportions may be used.

It will be appreciated that a major feature of the invention is the production of improved metallic pigment paints. As indicated above, the utilization of the aquachrom in leafing metallic pigment compositions markedly improves them. While specific examples of aluminum pastes have been mentioned, it is to be understood that the aquachrom may be employed with other types of metallic pigments, such as copper, lead and the like to produce stabilized pigment pastes and paints.

The improvements imparted by the chromium-containing adjuvant may likewise be utilized in the production of leafing pigments, such as mica, as well as for the stimulative type of pigments like graphite.

It will be observed also that while the specific examples given herein mention the use of a chromium-glycol-borate composition, the inventive improvements are not limited to this. This improved pigment composition may be produced by utilizing the chromated solution or the chromated oil previously described as the effective pigment stabilizing component. The type of chromium-containing adjuvant which is employed will depend on the type of composition with which it is used and particularly upon the vehicle employed in the coating composition. It will be seen that the invention may be employed in compositions of water soluble gums, resins, cellulose derivatives, alginates and the like as well as in compositions of oil soluble natural and synthetic resins, and paint oils, either processed or as commercially available.

It will thus be appreciated that while preferred modifications of the invention have been described these are given to illustrate the underlying principles involved and do not limit the useful scope of the invention to the illustrative embodiments.

I claim:

1. A method of producing protective coatings which comprises dissolving chromic acid in water, then adding the water solution to ethylene glycol monoethyl ether, at room temperature to control the reaction of same, and incorporating the resulting product in a protective coating vehicle.

2. A method of producing protective coatings which comprises dissolving chromic acid in water, adding the aqueous solution with ethylene glycol monoethyl ether, at room temperature to control the reaction of same, and incorporating the resulting product in a paint vehicle.

3. A method of producing protective coatings which comprises dissolving chromic acid with ethylene glycol monoethyl ether, at room temperature to control the reaction of the same, and incorporating the resulting product in a paint vehicle.

4. As an improved paint vehicle a drying oil having incorporated therein the reaction product of chromic acid and ethylene glycol monoethyl ether.

5. As an improved vehicle for water paints the reaction product of chromic acid and ethylene glycol monoethyl ether homogeneously dispersed in an aqueous solution of a water soluble base.

6. An improved coating composition comprising an aqueous solution of casein in which is incorporated a solution of the reaction product of water soluble chromic acid and ethylene glycol monoethyl ether.

7. A stabilized aluminum paste of improved leafing properties which comprises polished aluminum flakes and mica dispersed in a vehicle containing the reaction product of chromic acid and ethylene glycol monoethyl ether.

8. As an improved paint aluminum powder dispersed in an aqueous casein solution which solution contains the reaction product of chromic acid and ethylene glycol monoethyl ether.

9. A stabilized aluminum paste of marked and persistent leafing properties which comprises aluminum flakes dispersed in a solution of a water soluble boriborate of the group consisting of glyceryl and glycol boriborate and its reaction product with the reaction product of chromic acid and ethylene glycol monoethyl ether.

10. A stabilized aluminum paste of marked and persistent leafing properties which comprises aluminum flakes dispersed in a solution of water soluble compound of the group consisting of glyceryl and glycol borate reacted with the reaction product of chromic acid and ethylene glycol monoethyl ether.

JAMES JOSEPH O'LOUGHLIN.